Nov. 3, 1953  J. L. PETTUS  2,657,870
MOTOR DRIVE SYSTEM FOR MOTION-PICTURE EQUIPMENT
Filed Oct. 31, 1950  2 Sheets-Sheet 1
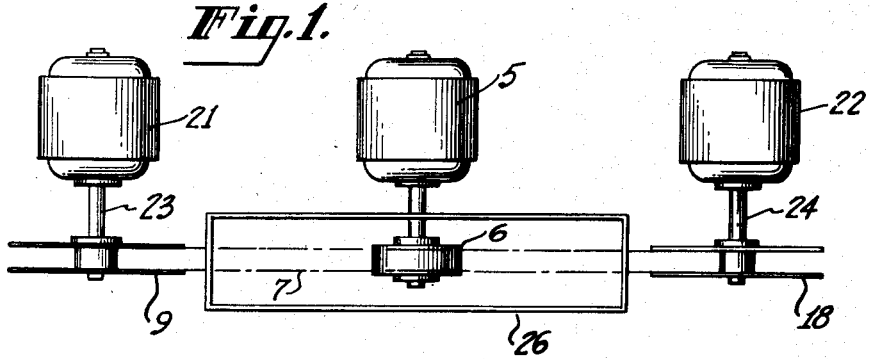
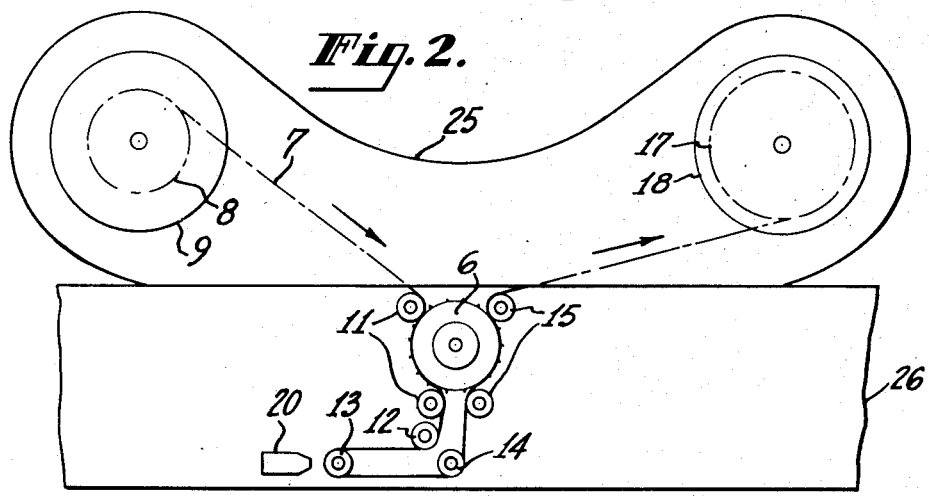
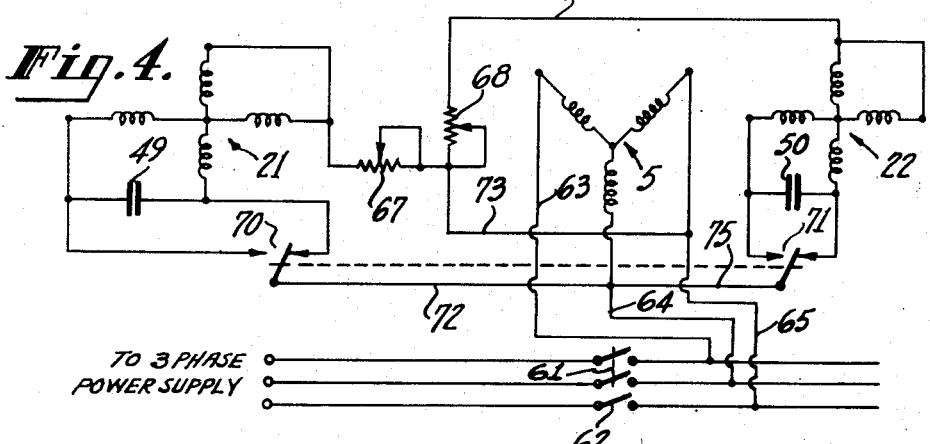
INVENTOR.
JAMES L. PETTUS,
BY
ATTORNEY Nov. 3, 1953  J. L. PETTUS  2,657,870
MOTOR DRIVE SYSTEM FOR MOTION-PICTURE EQUIPMENT
Filed Oct. 31, 1950  2 Sheets-Sheet 2

INVENTOR.
JAMES L. PETTUS
BY
ATTORNEY

Patented Nov. 3, 1953

2,657,870

UNITED STATES PATENT OFFICE 2,657,870

MOTOR DRIVE SYSTEM FOR MOTION-PICTURE EQUIPMENT

James L. Pettus, Encino, Calif., assignor to Radio Corporation of America, a corporation of Delaware Application October 31, 1950, Serial No. 193,109

9 Claims. (Cl. 242—55)

This invention relates to electrical motor drive systems, and particularly to a plural motor drive system for motion picture sound film recorders.

In the advancement of motion picture film, either with pictures only, sound only, or with both pictures and sound, electrical motors are used for advancing the film through the specific apparatus, such as a sound projector, sound recorder, and sound reproducer. The film used is usually on reels or in rolls, and is fed from a supply reel to a takeup reel. These reels are generally enclosed in magazines, particularly if the apparatus is a sound recorder. The apparatus usually employs a sprocket for advancing the film, the film passing over a filter roller in order to provide it with uniformly constant speed at the sound translation point. This constant speed is subject to variations which may come from the film supply and takeup reels. For instance, the film may feed off the supply reel in jerks, so usually a drag of some form is used to maintain a substantially constant tension in the film at this point.

It also becomes desirable at times to reverse the film without removing the reels or rolls, particularly in sound film reproducers. The present invention permits this to be accomplished in a very simple and rapid manner. Another feature of the invention is that the film is easily threaded and the reel motor system is easily connected into the power supply of the main film drive motor.

The invention includes three mutually, electrically controlled motors, one for the film sprocket, and one for each of the film reels. The motors are mechnically independent, so they independently drive their respective loads or maintain the necessary tension in the film so that no slack occurs in the film path at any time.

The principal object of the invention, therefore, is to facilitate the feeding or advancement of film from and to supply reels through film systems.

Another object of the invention is to supply an improved film magazine drive and controls therefor.

A further object of the invention is to provide an improved film drive motor system which aids in threading the film, the advancement of the film, and the rewinding of the film.

A still further object of the invention is to provide an improved motor drive for motion picture equipment.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a plan view of the invention embodied in a sound film recorder.

Fig. 2 is an elevational view of the system shown in Fig. 1.

Fig. 4 is a schematic circuit diagram of another embodiment of the control circuits.

Figure 3:
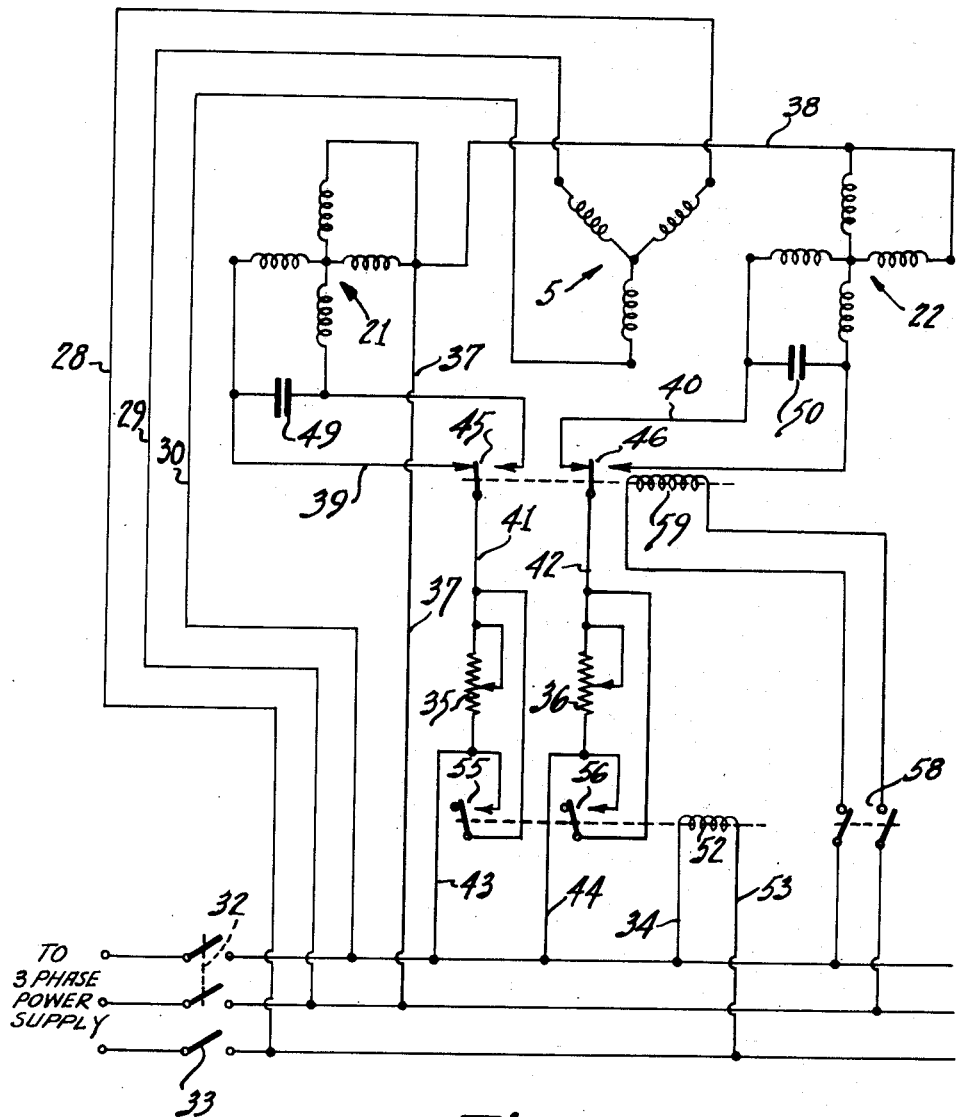
Fig. 3 is a schematic circuit diagram of one embodiment of the control circuits.

Referring now to the drawings, in which the same numerals identify like elements, a self-synchronous type of motor 5 drives a main film sprocket 6, usually through a reduction gear box, not shown. A film 7 is shown being supplied from a roll 8 on a reel 9 to the left-hand side of sprocket 6 under rollers 11 around a tensioning and guide roller 12, around a drum 13, which is usually film-pulled, around a tensioning and guide roller 14, and over the right-hand end of the sprocket 6 under rollers 15, from which it goes to a roll 17 on a reel 18. For purposes of illustration, an optical unit is diagrammatically illustrated at 20. The reels 9 and 18 are shown in a magazine 25 on a film sound recorder 26.

In Fig. 1, single phase induction motors having high resistance rotors, and commonly known as torque motors, are shown at 21 and 22. Motor 21 is directly connected by a shaft 23 to the hub of the reel 9, and motor 22 is directly connected by a shaft 24 to the hub of reel 18. No slipping clutches, pulleys, belts, or chains are used. As mentioned above, motor 5 is of the self-synchronous type, so that it my be locked in position at standstill with other similar motors, and then accelerated in step with similar motors. A three-phase synchronous motor could also be used.

Referring now to Fig. 3, the motor 5 is shown with only a three-phase stator winding, it being understood that a self-synchronous motor has a three-phase rotor winding interconnected with the rotors of similar motors to be driven in synchronism. The stator is connected over conductors 28, 29, and 30 to any suitable three-phase power supply over switches 32 and 33. Thus, when switch 32 is closed, single phase energy is supplied to motor 5 to lock it up and when switch 33 is closed, three-phase energy is supplied to start and run the motor.

When switch 32 is closed, single phase energy is also supplied to motors 21 and 22 over resistors 35 and 36, conductors 37 to 44, inclusive, and switch contacts 45 and 46. The motors 21 and 22 are shown with starting condensers 49 and 50. The circuits just traced energize the motors 21 and 22 at approximately twenty-five percent of their rated value for normal operation. Under these conditions, a low value of torque is created, but sufficient to take up the slack in film 7. The motors remain stalled and the film stopped and taut. Because of the inherent design of these motors, they may withstand this condition without damage. Each motor is connected to run in the same direction, this direction being counterclockwise in Fig. 2.

Now, when switch 33 is closed, the motor 5 is started, relay 52 is energized over conductors 34 and 53, and the resistors 35 and 36 are short-circuited by switches 55 and 56 making their right-hand contacts. This supplies normal torque to motors 21 and 22 sufficient for motor 22 to wind the film on reel 18 as it is advanced thereto by sprocket 6 driven by motor 5. Motor 21, however, provides a holdback tension on the film to aid in obtaining uniform film motion at drum 13.

To stop the system, switch 33 is first opened, which allows motors 21 and 22 to take up slack at reduced torque, since relay 52 is now de-energized and resistors 35 and 36 are back in the energizing circuits of these motors. As it takes the recording mechanism a longer time to coast to a stop because of its greater inertia, the motors 21 and 22 maintain the film taut during this time period. Switch 32 is next opened, and the system becomes neutral. The closing of switch 58 energizes a relay 59, which switches conductors 41 and 42 to the other sides of condensers 49 and 50 to reverse the motors, the film then feeding onto reel 9 from underneath and off of reel 18 from the top. When the sprocket 6 is reversed, motor 21 will wind the film on roll 8 and motor 22 provides the holdback tension.

Motors 21 and 22 have twelve poles to provide a synchronous no-load speed of 600 revolutions per minute at sixty cycles. This provides overdrive to the reels having a ratio varying between 600/350 and 600/50 revolutions per minute approximately for minimum and maximum speed, respectively, of a reel having a hub diameter of two inches and a film speed of ninety feet per minute.

In Fig. 4, a simplified circuit is shown when the motor 5 is of the self-synchronous type with three-phase Y-connected windings, as shown. This circuit shows the three-phase power supply connected to switches 61 and 62, and the windings of motor 5 connected over conductors 63, 64, and 65. Resistor 67 and resistor 68 may be previously set to provide the desired normal operating voltage for each of motors 21 and 22. Reversing switches are shown at 70 and 71, which may be interconnected and operated by hand or by relay, as in Fig. 3.

The system of Fig. 4 is operated in the same manner as that of Fig. 3. That is, switch 61 is first closed, which locks up motor 5. The motors 21 and 22 are also energized over conductors 64, 72, 73, 74, and 75, and the stator windings of motor 5. The normal line voltage may be 230 volts, but the circuit just traced would apply approximately 115 volts to the motors 21 and 22 because of the voltage drop in the stator windings. This voltage is then reduced to approximately 75 volts by resistors 67 and 68, which provides the desired standstill torque to take up film slack.

Now, when switch 62 is closed, motor 5 is started and full voltage is supplied to motors 21 and 22 over conductors 64, 72, 73, 74, and 75 only. The system then operates the same as described above. The supply reel motor provides the holdback tension, and the takeup reel motor takes up the film, the differential being supplied by the film drive motor 5.

I claim:

1. A plural film drive motor control system comprising a first motor, means for advancing a film with said motor, a pair of motors, means for winding said film with one of said motors, means for introducing tension in said film with the other of said pair of motors, means for partially energizing all of said motors simultaneously to tension said film at standstill, and means for normally energizing all of said motors simultaneously for advancing said film, said first motor advancing said film to said winding means and pulling said film against the tension introduced by said other of said pair of motors.

2. A plural film drive motor control system in accordance with claim 1, in which said winding film means is a film takeup reel directly connected to said first mentioned motor of said pair and said tensioning means is a film supply reel directly connected to said other motor of said pair, said other motor tending to hold back said film as it is advanced by said first mentioned means.

3. A plural film drive motor control system in accordance with claim 1, in which said first motor is a three-phase self-synchronous motor and said pair of motors are single phase induction motors having high resistance rotors.

4. A control circuit for a film advancing motor and a pair of film reel motors comprising a three-phase power supply, a first switch for supplying power from one phase of said supply to all of said motors to partially energize said film advancing motor, means in the circuit between said one phase of said power supply and said pair of motors for limiting the energy to and partially energizing said pair of motors to tension said film, a second switch for connecting the other phases of said three-phase power supply to said film advancing motor, and means connected to said power supply through said second switch for eliminating said energy limiting means from said circuit when three-phase power is supplied to said film advancing motor.

5. A control circuit in accordance with claim 4, in which said energy limiting means are resistors in said circuit, and said eliminating means is a relay connected to said power supply for short-circuiting said resistors when said three-phase power is supplied to said film advancing motor.

6. A control circuit in accordance with claim 4, in which motor reversing switches are provided in said circuit to said pair of motors and a relay energized by said power supply is provided for actuating said motor reversing switches.

7. A film magazine reel drive comprising a pair of torque motors, a film supply reel, a film takeup reel, means for directly connecting one of said motors to said supply reel, means for directly connecting the other of said motors to said takeup reel, a film advancing sprocket, a motor connected to said sprocket, a film threaded from said supply reel over said sprocket to said takeup reel, and means for partially energizing said torque motors for tensioning said film at standstill, said means including the stator windings of said sprocket motor.

8. A power control system for a self-synchronous motor and a pair of single phase induction motors, said self-synchronous motor driving a film advancing sprocket and one of said pair of motors being connected to a film supply reel and the other of said pair of motors being connected to a film takeup reel, comprising a three-phase power supply, a first switch, a circuit for connecting one phase of said power supply to said self-synchronous motor to lock said motor and to said pair of motors through the windings of said self-synchronous motor, a second switch for connecting the three phases of said power supply to said self-synchronous motor, and a circuit for directly connecting said pair of motors to one phase of said power supply.

9. A power control system in accordance with claim 8, in which a pair of switches are provided for reversing said pair of motors.

JAMES L. PETTUS.

References Cited in the file of this patent

UNITED STATES PATENTS

| Number | Name | Date |
| --- | --- | --- |
| 2,071,192 | Younts | Feb. 16, 1937 |
| 2,325,454 | Wilcox | July 27, 1943 |